United States Patent Office 3,438,976
Patented Apr. 15, 1969

3,438,976
1-SULFONYL-3-NORTROPANYL-UREA DERIVATIVES
Ernst Jucker, Ettingen, Adolf Lindenmann and Erhard Schenker, Basel, and Fulvio Gadient and Andre Stoll, Birsfelden, Switzerland, assignors to Sandoz, Ltd., Basel, Switzerland
No Drawing. Filed June 10, 1966, Ser. No. 556,544
Claims priority, application Switzerland, June 14, 1965, 8,248/65; Jan. 14, 1966, 507/66; Mar. 11, 1966, 3,573/66; Mar. 16, 1966, 3,808/66
Int. Cl. C07d 43/06; A61k 27/00
U.S. Cl. 260—239.6                13 Claims The present invention relates to new sulphonyl-urea derivatives and a process for their production.

The present invention provides heterocyclic sulphonyl-urea derivatives of Formula I,

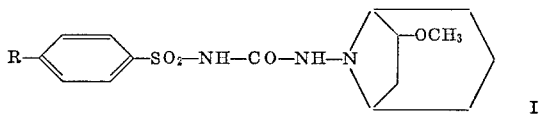

in which R signifies a hydrogen or halogen atom, an alkyl, alkoxy, alkylthio, alkylsulphinyl, alkylsulphonyl radical having from 1 to 3 carbon atoms inclusive, or the nitro, amino or acetylamino radical,
and their alkali and ammonium salts.

The present invention further provides a process for the production of compounds I, characterized in that 8-amino-6-methoxy-nortropane of Formula II

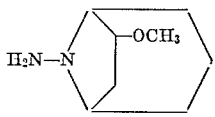

is reacted with a compound of Formula III,

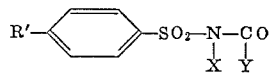

in which
R' has the same significance as R with the exception of the amino radical,
and either X signifies a hydrogen atom and
Y signifies a radical capable of being removed together with a hydrogen atom of the primary amino radical of the amine of Formula II
or X and Y together signify a second bond between the carbon and the nitrogen atom, when a compound I is obtained in which R signifies the nitro or acetylamino radical and a compound I is desired in which R signifies the primary amino radical, this conversion is effected by reduction or hydrolysis and the resulting compound I is optionally converted into its alkali or ammonium salts.

A lower alkoxy, an amino or acetylamino radical may be used as the radical Y capable of being split off in Formula III. Suitable starting materials of Formula III are thus the lower alkyl esters, preferably the methyl or ethyl ester, e.g. of a 4-toluene- or 4-chlorobenzoic-sulphonyl-carbamic acid, their amides (i.e. 4-toluene- or 4-chlorobenzene-sulphonyl-urea) or N-acetylamides (i.e. 1-acetyl-3-sulphonyl-urea derivatives).

When X and Y in the Formula III signify a second bond between the carbon and the nitrogen atom, the starting materials are, for example, 4-toluene- or 4-chlorobenzene-sulphonyl-isocyanates.

The process may, for example, be effected as follows, depending on the starting materials used:

A solution of 8-amino-6-methoxy-nortropane of Formula II in an anhydrous organic solvent, e.g. absolute benzene, toluene, xylene, dimethyl formamide, is added to a solution of a benzenesulphonyl-carbamic acid ester, e.g. 4-toluene- or 4-chlorobenzenesulphonyl-carbamic acid ethyl ester, preferably in the same solvent and the reaction mixture is then heated for 1 to 6 hours to 70–80° C. or at the reflux temperature of the solvent. After removing the solvent, e.g. by filtration or distillation, the final product is isolated in manner known per se and optionally purified by crystallization.

The reaction of 8-amino-6-methoxy-nortropane with a benzene-sulphonyl-carbamic acid ester (Formula III) may likewise be effected without solvent, i.e. by melting.

When a sulphonyl-urea or sulphonyl-acetyl-urea derivative, e.g. 4-toluenesulphonyl-urea or 1-(4-chlorobenzene-sulphonyl)-3-acetyl-urea, is used as starting material of Formula III the process of the invention is effected in that a mixture of the urea derivative and 8-amino-6-methoxy-nortropane in absolute benzene, toluene or xylene is heated to 80–140° C. for 1 to 2 hours, preferably in an atmosphere of nitrogen, the solvent is subsequently removed and the final product isolated and purified in manner known per se.

When a sulphonyl-isocyanate, e.g. 4-toluene- or 4-chlorobenzene-sulphonyl isocyanate, is used as starting material, this is dissolved in an anhydrous organic solvent, e.g. absolute benzene or toluene, and this solution is slowly added at room temperature to a solution, preferably in the same solvent, of 8-amino-6-methoxy-nortropane. The mixture is kept at 20–80° C. for ½ to 3 hours to complete the reaction and the final product is then worked up in manner known per se.

The compounds of Formula I, in which R signifies the amino radical, can not be produced in the manner described above, but may be obtained from the corresponding acetylamino or nitro compounds produced by the methods described above: the acetyl radical is split off hydrolytically, preferably with an aqueous alkali; the nitro radical is reduced, e.g. catalytically with palladium on charcoal in dimethyl formamide.

The compounds of the invention are solid, crystalline compounds at room temperature; with ammonia or an alkali they form crystalline salts which are stable at room temperature.

The heterocyclic sulphonyl-urea derivatives of the invention have valuable pharmacodynamic properties. Thus, in tests effected with animals (rats, dogs) they exhibit a marked blood sugar lowering effect, which lasts for a long time and already sets in when low doses are administered. Furthermore, the compounds are well tolerated and have a low toxicity in comparison with their effectiveness. Especially worthy of note in this respect are 1-(4-chlorobenzene-sulphonyl)-3-(6-methoxy-nortropan-8-yl) urea and 1-(4-toluenesulphonyl) - 3 - (6-methoxy-nortropan-8-yl) urea.

The compounds of the invention are therefore indicated for use in the treatment of diabetes mellitus, in which case they are preferably administered per os in a daily dose of 50 to 1000 mg.

In order to produce suitable medicinal preparations the compounds are worked up with the usual organic or inorganic adjuvants which are inert and physiologically acceptable. Suitable medicinal preparations are, for example, tablets, dragées, capsules, syrups, injectable solutions. The preparations may contain adjuvants, e.g. polyvinyl pyrrolidone, methyl cellulose, talcum, magnesium stearate, stearic acid and sorbic acid, and suitable preserving agents, sweetening and colouring substances and flavourings.

EXAMPLE OF A GALENIC PREPARATION: TABLETS

| | G. |
|---|---|
| 1 - (4 - toluenesulphonyl) - 3 - (6 - methoxy-nortropan-8-yl) urea [1] | 0.100 |
| Magnesium stearate | 0.0010 |
| Polyvinyl pyrrolidone | 0.0040 |
| Talcum | 0.0050 |
| Maize starch | 0.010 |
| Lactose | 0.038 |
| Dimethyl silicone oil | 0.0005 |
| Polyethylene glycol—6000 | 0.0015 |
| For a tablet of | 0.160 |

[1] The compound of Example 1.

The benzenesulphonyl-carbamic acid, benzenesulphonyl isocyanate, benzenesulphonyl-urea or benzenesulphonyl-acetyl-urea derivatives, used as starting materials of Formula III, insofar as they have not hitherto been described, may be obtained from the corresponding substituted benzene-sulphonamides of Formula IV,

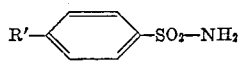

IV in which R' has the above significance.

The sulphonyl-carbamic acid esters, e.g. the methyl or ethyl ester, is obtained in that a benzene-sulphonamide is treated with a corresponding chloroformic acid ester in a suitable organic solvent, e.g. acetone, in the presence of an alkaline condensation agent, e.g. sodium or potassium carbonate, for 5 to 8 hours at 40–70° C. The compound which precipitates from the cooled reaction mixture is then dissolved in water and the aqueous solution is acidified with a mineral acid, e.g. concentrated hydrochloric acid, whereby the desired sulphonyl-carbamic acid ester precipitates, is isolated by filtration and subsequently purified, e.g. by crystallization.

The benzenesulphonyl-isocyanates used as starting materials may be produced in that the corresponding sulphonamide is heated to about 150–200° C. with phosgene in a suitable organic solvent, e.g. nitrobenzene or dichloro- or trichloro-benzene, preferably 1,2,4-trichloro-benzene, the solvent is removed from the reaction mixture by distillation and the desired sulphonyl isocyanate is isolated and purified in manner known per se, e.g. by distillation or crystallization.

Benzenesulphonyl-ureas may be obtained as follows:

The corresponding sulphonamide is heated for 4 to 6 hours with an alkali metal cyanate in an aqueous alcoholic solution, the precipitated alkali metal salt of the urea derivative is subsequently filtered off from the resulting reaction mixture, is dissolved in a small amount of water, the aqueous solution is acidified with a dilute mineral acid, e.g. dilute hydrochloric acid, and the benzenesulphonyl urea derivative is isolated therefrom in manner known per se.

The 1-benzenesulphonyl - 3 - acetyl-ureas may be obtained either by heating the corresponding sulphonyl-urea derivatives with glacial acetic acid in the presence of a small amount of sulphuric acid or by reacting the corresponding sulphonyl isocyanates with acetamide in manner known per se.

The term "in manner known per se" as utilized herein designates methods in use or described in the literature on the subject.

In the following non-limitative examples all temperatures are indicated in degree centigrade and are uncorrected.

Example 1.—1-(4-toluenesulphonyl)-3-(6-methoxy-nortropan-8-yl)urea 0.35 ml. of glacial acetic acid and subsequently a solution of 5.6 g. of 8-amino-6-methoxy-nortropane in 10 ml. of absolute benzene are added at room temperature to 8.7 g. of 4-toluenesulphonyl-carbamic acid ethyl ester in 25 ml. of absolute benzene. The reaction solution is heated to 75° for 4 hours, the benzene is evaporated in a vacuum and absolute ethanol is added to the semi-solid residue, whereby crystallization occurs. The solid material is filtered off and recrystallized twice from absolute ethanol; melting point 210–212°. The following compounds are obtained in an analogous manner:

Example 2.—1-(4-chlorobenzenesulphonyl)-3-(6-methoxy-nortropan-8-yl)urea

This compound is obtained from 8.45 g. of 4-chloro-benzenesulphonyl-carbamic acid ethyl ester and 5.0 g. of 8-amino-6-methoxy-nortropane. Melting point 202–204° (after recrystallizing twice from ethanol).

Example 3.—1-(4-methylthio-benzenesulphonyl)-3-(6-methoxy-nortropan-8-yl)urea

This compound is obtained from 13.8 g. of 4-methyl-thio-benzenesulphonyl-carbamic acid ethyl ester (melting point 144–145°) and 9.4 g. of 8-amino-6-methoxy-nortropane. Melting point 143–145° (decomposition) (after crystallization from ether/benzene (1:1) and recrystallization from ethyl acetate).

Example 4.—1-(4-acetylamino-benzenesulphonyl)-3-(6-methoxy-nortropan-8-yl)urea

This compound is obtained from 4.3 g. of 4-acetylamino-benzenesulphonyl-carbamic acid ethyl ester and 2.82 g. of 8-amino-6-methoxy-nortropane in absolute toluene. Melting point 220–222° (after crystallizing from ethanol/dioxane/water 1:1:1).

Example 5.—1-sulphanilyl-3-(6-methoxy-nortropan-8-yl)urea 230 ml. of N sodium hydroxide are added to 30.0 g. of 1 - (4 - acetylamino-benzenesulphonyl) - 3 - (6-methoxy-nortropan-8-yl)urea (production see Example 4).

The reaction solution is heated at reflux for 3 hours. After cooling, the reaction solution is purified over animal charcoal and the pH value is adjusted to 4 with acetic acid at 5°. The resulting precipitate is filtered off, washed with water and taken up in chloroform. The residue obtained after drying over magnesium sulphate and evaporating the solvent is rapidly crystallized from a mixture of ethanol and ethyl acetate (1:1). The compound mentioned in the heading has a melting point of 173–175°.

Example 6.—1-(4-chlorobenzene-sulphonyl)-3-(6-methoxy-nortropan-8-yl)urea

A mixture of 2.7 g. of 1-(4-chlorobenzene-sulphonyl)-3-acetyl-urea (produced from 4-chlorobenzene-sulphonyl-urea and acetic anhydride in the presence of sulphuric acid; melting point 160–161°) and 1.5 g. of 8-amino-6-methoxy-nortropane in 5 ml. of absolute xylene is heated to 130–140° for 2 hours whilst a stream of nitrogen is passed through. The xylene is subsequently distilled off at 15 mm. of Hg, 50 ml. of absolute ethanol are added to the residue and evaporation is effected at 15 mm. of Hg. The crude product is rubbed with a small amount of absolute ethanol, whereupon the urea derivative crystallizes on standing overnight. Melting point 202–204°, after recrystallizing twice from ethanol.

Example 7.—1-(4-toluenesulphonyl)-3-(6-methoxy-nortropan-8-yl)urea

A solution of 1.5 g. of 8-amino-6-methoxy-nortropane in 20 ml. of absolute toluene is added dropwise whilst stirring during the course of 30 minutes to a solution of 1.9 g. of 4-toluenesulphonyl-isocyanate in 60 ml. of absolute toluene. Heating to 60–65° is effected for 3 hours and the toluene is subsequently evaporated at 15 mm. of Hg. The residue is rubbed with cold ethanol, whereby 1-(4-toluenesulphonyl)-3-(6-methoxy-nortropan-8-yl)urea separates in crystalline form. Melting point 210–212° after crystallization from methanol.

Example 8.—1-(4-chlorobenzenesulphonyl)-3-(6-methoxy-nortropan-8-yl)urea

This compound is obtained from 4.4 g. of 4-chlorobenzenesulphonyl-isocyanate and 3.1 g. of 8-amino-6-methoxy-nortropane. Melting point 202–204° (after recrystallizing twice from ethanol).

Example 9.—1-(4-ethylbenzenesulphonyl)-3-(6-methoxy-nortropan-8-yl)urea

A solution of 3.37 g. of 8-amino-6-methoxy-nortropane in 5 ml. of absolute toluene is added at room temperature and in an atmosphere of nitrogen to 4.58 g. of 4-ethylbenzene-sulphonyl-carbamic acid ethyl ester in 30 ml. of absolute toluene, whereby the mixture slightly heats itself to about 30°. After heating at reflux for one hour, the cooled reaction mixture is washed with water and then extracted with 2 N ammonia. The pH value of the ammoniacal extract is adjusted to 6 with 2 N hydrochloric acid, the insoluble material is removed by filtration and the pH value of the solution is then adjusted to 3 by the careful addition of 2 N hydrochloric acid whilst stirring and cooling. The resulting precipitate is filtered off, crystallized from ethanol and then from ethylmethyl-ketone. The compound mentioned in the heading has a melting point of 160–162°.

The 4-ethylbenzene-sulphonyl-carbamic acid ethyl ester used as starting material is produced as follows:

8.58 g. of chloroformic acid ethyl ester are added dropwise at room temperature and whilst stirring to a mixture of 11.15 g. of 4-ethylbenzene-sulphonamide and 21.56 g. of potassium carbonate in 180 ml. of acetone and the reaction mixture is heated at reflux for 18 hours. After cooling the mixture, the precipitate is filtered off and dissolved in 250 ml. of cold water. The aqueous solution is then acidified with 5 N hydrochloric acid at 0° and whilst stirring, the resulting oil is extracted with benzene, the benzene extract washed with water and dried over sodium sulphate. The oily residue obtained after evaporation of the benzene is rubbed with pentane and the resulting crystals are fractionally recrystallized from ether/petroleum ether. 4-ethylbenzene-sulphonyl-carbamic acid ethyl ester has a melting point of 51–53°.

The following compounds may be obtained in an analogous manner:

Example 10.—1-benzenesulphonyl-3-(6-methoxy-nortropan-8-yl)urea

This compound is produced from 20.6 g. of benzenesulphonyl-carbamic acid ethyl ester and 16.9 g. of 8-amino-6-methoxy-nortropane. Melting point 206–208° (after recrystallization from ethanol/ethyl acetate and dioxane/ether).

Example 11.—1-(4-bromobenzenesulphonyl)-3-(6-methoxy-nortropan-8-yl)urea

This compound is produced from 13.3 g. of 4-bromobenzene-sulphonyl-carbamic acid ethyl ester and 7.3 g. of 8-amino-6-methoxy-nortropane. Melting point 175–177° (decomposition) (after recrystallization from ethanol, trichloroethylene/cyclohexane and dimethyl sulphoxide).

Example 12.—1-(4-nitrobenzenesulphonyl)-3-(6-methoxy-nortropan-8-yl)urea

This compound is produced from 22.0 g. of 4-nitrobenzene-sulphonyl-carbamic acid ethyl ester and 15.0 g. of 8-amino-6-methoxy-nortropane in absolute benzene. Melting point 176–179° (after taking up in methylene chloride, evaporating the solvent and rapidly crystallizing the resulting oil from ethanol).

Example 13.—1-(4-nitrobenzenesulphonyl)-3-(6-methoxy-nortropan-8-yl)urea

A solution of 3.3 g. of 4-nitrobenzenesulphonyl-isocyanate in 12 ml. of absolute benzene is added at room temperature and in an atmosphere of nitrogen to 2.6 g. of 8-amino-6-methoxy-nortropane in 7 ml. of absolute benzene. The reaction solution is stirred at room temperature for 5 hours and is then allowed to stand for 15 hours. The solution is then washed with water and extracted with 2 N ammonia. The pH value of the ammoniacal solution is adjusted to 1 with hydrochloric acid whilst stirring and cooling. This turbid, aqueous solution is evaporated to approximately 70 ml. in a vacuum and then extracted with methylene chloride. The residue obtained after drying and evaporating the solvent is recrystallized from benzene and tetrahydrofuran/petroleum ether; melting point 176–179°.

Example 14.—1-(4-methylsulphonyl-benzenesulphonyl)-3-(6-methoxy-nortropan-8-yl)urea A solution of 15.6 g. of 8-amino-6-methoxy-nortropane in 65 ml. of benzene is added dropwise during the course of 10 minutes to a suspension of 30.7 g. of 4-methylsulphonyl-benzenesulphonyl-carbamic acid ethyl ester in 100 ml. of benzene. The reaction mixture is subsequently heated at reflux for 5 hours, is then cooled to room temperature and shaken out thrice, each time with 70 ml. of a 12.5% aqueous ammonia solution. The ammoniacal extract is made strongly acid with concentrated hydrochloric acid whilst cooling with ice and is extracted thrice, each time with 100 ml. of chloroform. After washing until neutral and drying the chloroform extract over magnesium sulphate, the solvent is distilled off, the oily residue dissolved in 50 ml. of ethanol and 100 ml. of ether are added to the solution, whereby the compound mentioned in the heading crystallizes. After recrystallizing from chloroform/ethanol/pentane the compound has a melting point of 160–162° (decomposition).

The 4-methylsulphonyl - benzenesulphonyl - carbamic acid ethyl ester used as starting material is produced as follows: 60.7 g. of chloroformic acid ethyl ester are added dropwise during the course of 10 minutes to a suspension of 101 g. of 4-methylsulphonyl-benzene-sulphonamide and 153 g. of potassium carbonate in 525 ml. of absolute acetone and the mixture is heated to the boil at reflux whilst stirring for 16 hours. The precipitated material is filtered off from the cooled reaction mixture, is dissolved in 2000 ml. of water, the alkaline solution is made strongly acid by the careful addition of concentrated hydrochloric acid, the precipitated crystalline product is filtered off, washed with water and dried. 4-methylsulphonyl-benzenesulphonyl-carbamic acid ethyl ester has a melting point of 124–126° after recrystallization from ethanol.

The following compound may be obtained in an analogous manner:

Example 15.—1-(4-methoxybenzenesulphonyl)-3-(6-methoxy-nortropan-8-yl)urea

This compound is produced from 25.9 g. of 4-methoxybenzenesulphonyl-carbamic acid ethyl ester and 15.6 g. of 8-amino-6-methoxy-nortropane. Melting point 144–148° (decomposition) (without recrystallization).

Example 16.—1-(methylsulphinyl-benzenesulphonyl)-3-(6-methoxy-nortropan-8-yl)-urea A solution of 29.1 g. of 4-methylsulphinyl-benzenesulphonyl-carbamic acid ethyl ester and 15.6 g. of 8-amino-6-methoxy-nortropane in 125 ml. of acetonitrile is heated to the boil at reflux for 5 hours. After concentrating the solution to half its volume, the reaction product crystallizes and is recrystallized from acetonitrile/ether. The compound indicated in the heading has a melting point of 153–157°.

The 4-methylsulphinyl-benzenesulphonyl-carbamic acid ethyl ester used as starting material is produced as follows:

53.5 g. of chloroformic acid ethyl ester are added dropwise during the course of 3 hours to a suspension of 82 g. of 4-methylsulphinyl-benzenesulphonamide and 134.5 g. of potassium carbonate in 460 ml. of absolute acetone, whereby the reaction temperature rises to 40°. The reaction mixture is subsequently heated to the boil at reflux for a further 18 hours. The precipitated material is filtered off from the cooled reaction mixture, the residue is dissolved in 2000 ml. of water, the alkaline solution is made strongly acid with concentrated hydrochloric acid and the compound which separates as an oil is extracted thrice, each time with 400 ml. of chloroform. The combined chloroform extracts are washed with water, dried and reduced in volume, whereby 4-methylsulphinyl-benzenesulphonyl-carbamic acid ethyl ester precipitates in crystalline form. Melting point 146–148°.

We claim:
1. A compound selected from the group consisting of a compound of the formula

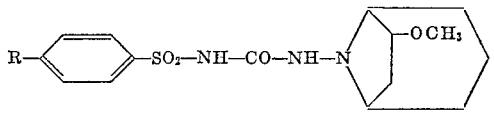

in which R is alkyl, alkoxy, alkylthio, alkylsulphinyl, alkylsulphonyl each of 1 to 3 carbon atoms, hydrogen, halogen, nitro, amino or acetyl amino, and alkali or ammonium salts thereof.

2. A compound according to claim 1 in which the compound is selected from the group consisting of 1-(4-toluene-sulphonyl) - 3 - (6-methoxy-notropan-8-yl)-urea and the alkali and ammonium salts thereof.

3. A compound according to claim 1 in which the compound is selected from the group consisting of 1-(4-chlorobenzenesulphonyl-3-(6-methoxy-nortropan-8-yl)-urea and the alkali and ammonium salts thereof.

4. A compound according to claim 1 in which the compound is selected from the group consisting of 1-(4-methylthiobenzenesulphonyl) - 3 - (6-methoxy-nortropan-8-yl)-urea and the alkali and ammonium salts thereof.

5. A compound according to claim 1 in which the compound is selected from the group consisting of 1-(4-acetylaminobenzenesulphonyl) - 3 - (6-methoxy-nortropan-8-yl)-urea and the alkali and ammonium salts thereof.

6. A compound according to claim 1 in which the compound is selected from the group consisting of 1-sulphanylyl-3-(6-methoxy-nortropan-8-yl)-urea and the alkali and ammonium salts thereof.

7. A compound according to claim 1 in which the compound is selected from the group consisting of 1-(4-ethylbenzenesulphonyl) - 3 - (6-methoxy-nortropan-8-yl)-urea and the alkali and ammonium salts thereof.

8. A compound according to claim 1 in which the compound is selected from the group consisting of 1-benzenesulphonyl-3-(6-methoxy-nortropan-8-yl)-urea and the alkali and ammonium salts thereof.

9. A compound according to claim 1 in which the compound is selected from the group consisting of 1-(4-bromobenzenesulphonyl) - 3 - (6-methoxy-nortropan-8-yl)-urea and the alkali and ammonium salts thereof.

10. A compound according to claim 1 in which the compound is selected from the group consisting of 1-(4-nitrobenzenesulphonyl) - 3 - (6 - methoxy-nortropan-8-yl)-urea and the alkali and ammonium salts thereof.

11. A compound according to claim 1 in which the compound is selected from the group consisting of 1-(4-methyl-sulphonyl-benzenesulphonyl) - 3 - (6 - methoxy-nortropan-8-yl)-urea and the alkali and ammonium salts thereof.

12. A compound according to claim 1 in which the compound is selected from the group consisting of 1-(4-methoxy-benzenesulphonyl) - 3 - (6-methoxy-nortropan-8-yl)-urea and the alkali and ammonium salts thereof.

13. A compound according to claim 1 in which the compound is selected from the group consisting of 1-(4-methyl-sulphinyl-benzenesulphonyl) - 3 - (6 - methoxy-nortropan-8-yl)-urea and the alkali and ammonium salts thereof.

References Cited

UNITED STATES PATENTS 3,372,164   3/1968   Haack et al. _____ 260—292

HENRY R. JILES, *Primary Examiner.*

A. L. ROTHMAN, *Assistant Examiner.*

U.S. Cl. X.R.

260—292, 470, 545, 556, 397.7, 453; 424—265